United States Patent [19]

Lighthill et al.

[11] Patent Number: 5,276,593
[45] Date of Patent: Jan. 4, 1994

[54] BICYCLE LIGHT SIGNAL

[76] Inventors: Von Lighthill, 1106 Lisenby; Charlie Lewis, 237 N. Church St., both of Panama City, Fla. 32401

[21] Appl. No.: 55,557
[22] Filed: May 3, 1993
[51] Int. Cl.$^5$ .............................................. B62J 6/00
[52] U.S. Cl. ..................................... 362/72; 340/432; 362/284; 362/324; 362/396
[58] Field of Search .................. 340/432, 474; 362/72, 362/193, 191, 284, 323, 324, 396, 811

[56] References Cited

U.S. PATENT DOCUMENTS

| | | | |
|---|---|---|---|
| 3,974,369 | 8/1976 | Chmela et al. | 362/72 |
| 4,088,882 | 5/1978 | Lewis | 362/72 X |
| 4,309,741 | 1/1982 | Smith | 362/72 |

*Primary Examiner*—Stephen F. Husar
*Attorney, Agent, or Firm*—S. Michael Bender

[57] ABSTRACT

A new and improved high visibility light signal apparatus for use on a bicycle includes a strobe light assembly which includes a source of electric power and a strobe lamp/driver assembly. A support assembly supports the strobe lamp/driver assembly on the bicycle. The support assembly includes a first end and a second end. The first end includes a lamp support for supporting the strobe lamp/driver assembly. The second end includes a connector for attaching the support assembly to the bicycle. The support assembly has a predetermined length; and the support assembly, in conjunction with the connector, is capable of supporting the strobe lamp/driver assembly on the bicycle in a plane spaced from and parallel to the longitudinal axis of the bicycle, such that light emitted from the strobe lamp/driver assembly is visible from the front, the left side, the right side, and the back of the bicycle and to the rider, simultaneously. The source of electric power may be an electric generator driven by rotation of a wheel of the bicycle or a battery.

15 Claims, 6 Drawing Sheets

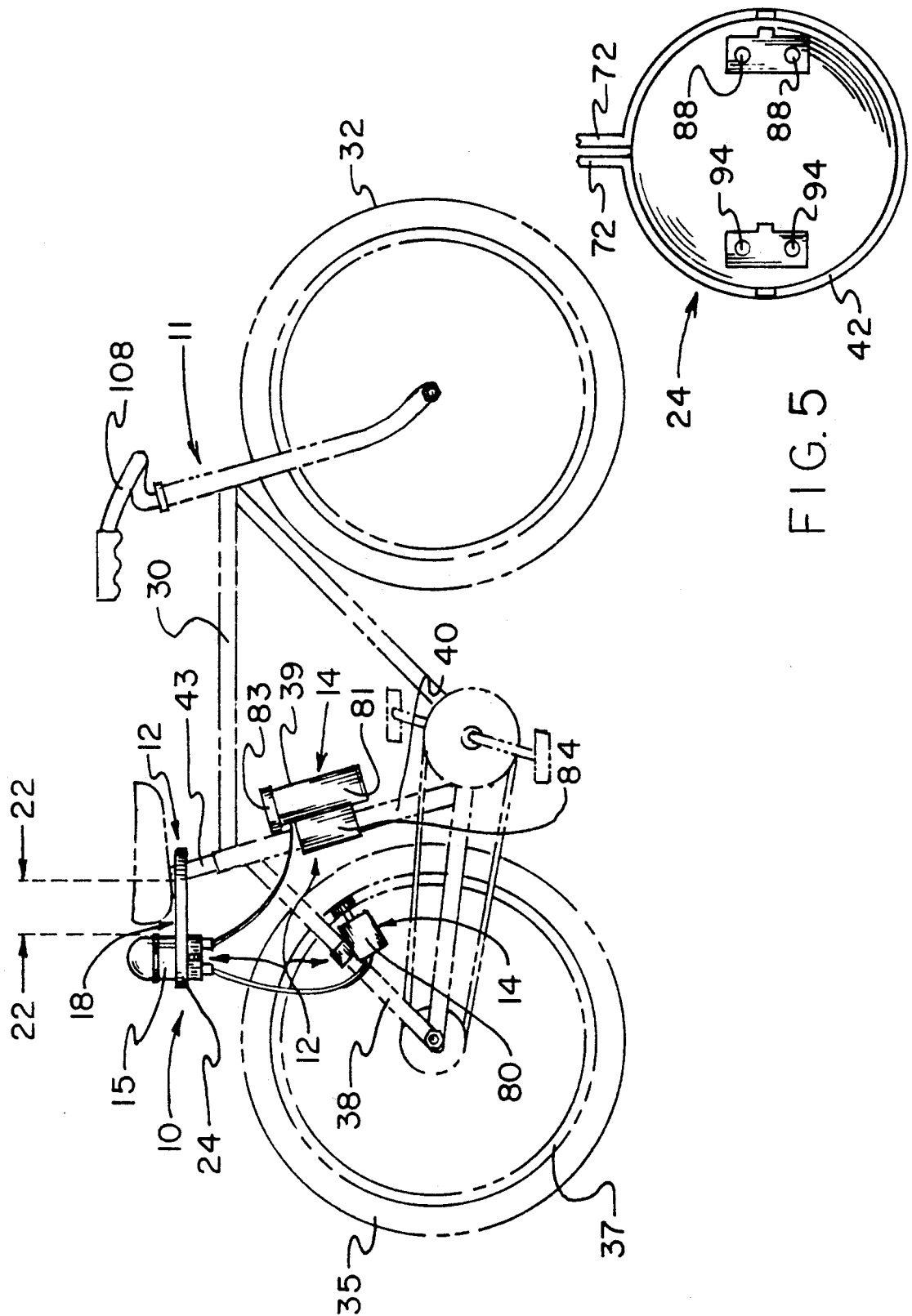

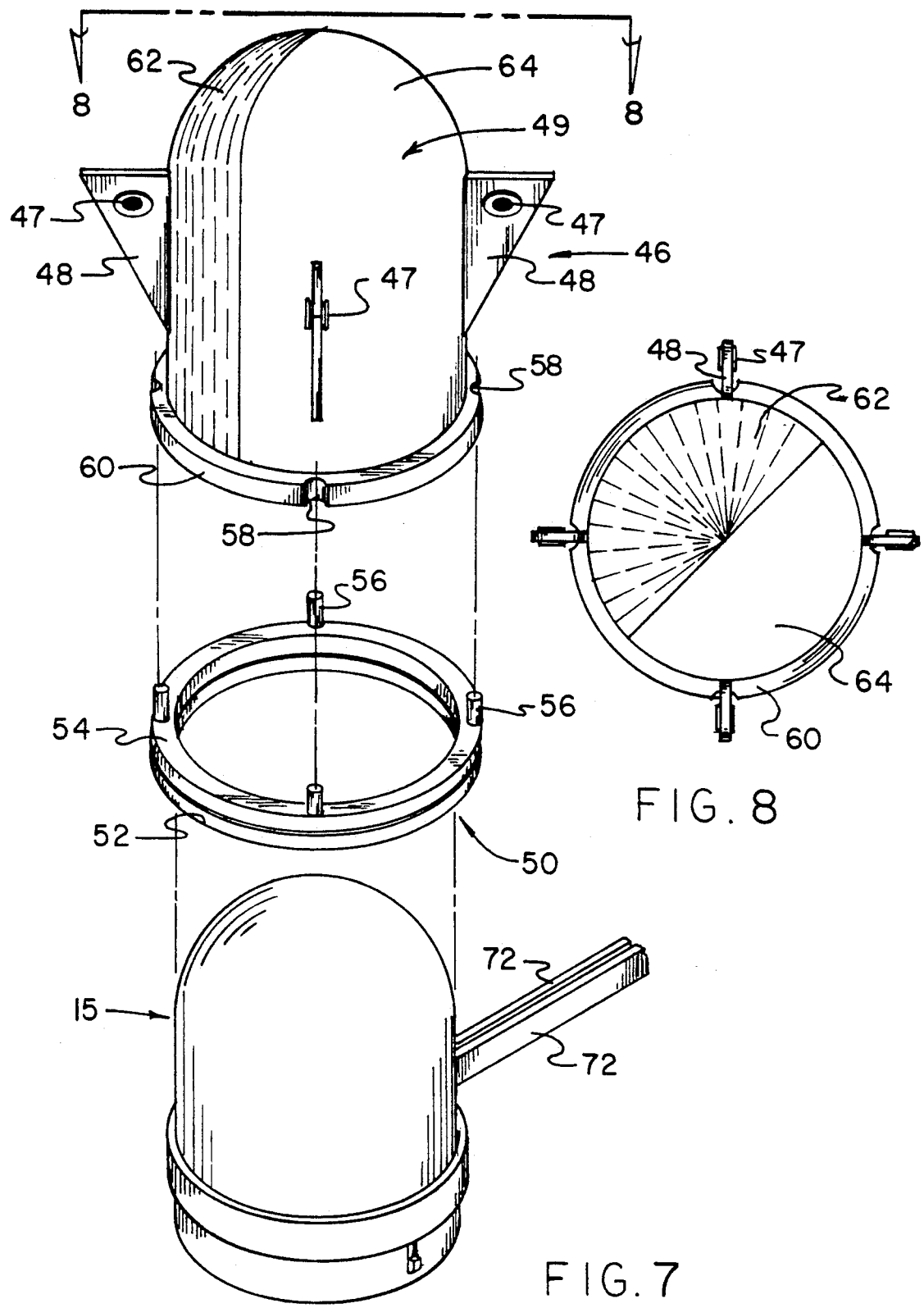

BICYCLE LIGHT SIGNAL

BACKGROUND OF THE INVENTION

1. Field of the Invention

The present invention relates generally to lights used on bicycles, and more particularly, to a light especially adapted for visibly signalling the presence of the bicycle to drivers of motor vehicles, other bicycle riders, and pedestrians.

2. Description of the Prior Art

Lights used on bicycles for visibly signalling the presence of the bicycle are well known in the art. The following U.S. patents disclose exemplary lights used on bicycles: U.S. Pat. Nos. 4,819,135; 4,860,177; 4,875,142; 4,974,124; and 5,015,918. More specifically, U.S. Pat. No. 4,819,135 discloses a plurality of flashing LED's placed in linear arrays along the bicycle frame. The LED's primarily face the side of the bicycle to provide a broadside visible signal. U.S. Pat. No. 4,860,177 has a plurality of parallel rows of lamps that flash in a moving pattern. The parallel rows of lamps face to the rear of the bicycle. U.S. Pat. No. 4,875,142 disclose bicycle safety lights that a secured to the ends of handle bars and face rearward, providing blinking light signals to drivers of vehicles at the rear of the bicycle. U.S. Pat. No. 4,974,124 discloses a headlight and accompanying electrical generator for a bicycle. U.S. Pat. No. 5,015,918 discloses a battery-powered and/or generator powered bicycle lighting system that employs circuitry for strobing LED's to provide high intensity flashes.

One problem associated with the above-described prior art bicycle light signalling devices is that the flashing signal lights are highly directional, primarily facing the rear of the bicycle or secondarily facing the side of the bicycle. They are not significantly visible from the front of the bicycle. In this respect, it would be desirable if a bicycle light signalling device were provided which directed a flashing light signal to the front of the bicycle.

Another problem associated with many conventional bicycle signal lights is that the bicycle rider is unaware when the signal light is burned out or otherwise malfunctioning. This can be a very dangerous situation. The rider may think that he is signalling his presence to drivers of motor vehicles, other bicycle riders, and pedestrians, but the signal may not be working. In this respect, it would be desirable if a bicycle signalling device were provided which gave an indication to the rider that the signal is either working or not working.

Many conventional bicycle signalling systems use large numbers of signalling elements. Such large numbers of elements can be quite expensive. Moreover, large numbers of lights may create a distraction to persons receiving the signal. In this respect, it would be desirable if a bicycle signalling device were provided which uses a single flashing signal light.

The prior art bicycle signalling devices discussed above include light signalling patterns where light alternates between on or off. During the off portion of the signal, the person being signalled may lose sight of the bicycle. Furthermore, an alternating on and off signal may be very fatiguing to the eyes of the person being signalled. In this respect, it would be desirable if a bicycle signalling device were provided which emitted two lighted state signals. That is, a first light signal having a first level of brightness and a second light signal having a second level of brightness.

As mentioned above, it is important that the bicycle rider be aware of whether as to the signalling lights are working or not. In this respect, it would be desirable, if in addition to the visible signal, a device were provided that gave an audible signal to the rider indicating that the signal light was operating.

As mentioned above, many prior art bicycle signalling lights are highly directional. In this respect, it would be desirable if a bicycle signalling device were provided that provided a visible signal in a pattern of nearly 360 degrees around the signal light.

Thus, while the foregoing body of prior art indicates it to be well known to use signal lights for bicycles, the prior art described above does not teach or suggest a high visibility bicycle light signal apparatus which has the following combination of desirable features: (1) directs a flashing light signal to the front of the bicycle; (2) gives an indication to the rider that the signal is either working or not working; (3) uses a single flashing signal light; (4) emits two lighted state signals, a first light signal having a first level of brightness and a second light signal having a second level of brightness; (5) gives an audible signal to the rider indicating that the signal light is operating; and (6) provides a visible signal in a pattern of nearly 360 degrees around the signal light. The foregoing desired characteristics are provided by the unique high visibility bicycle light signal apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved high visibility light signal apparatus for use on a bicycle. The apparatus includes a strobe light assembly which includes a source of electric power and a strobe lamp/driver assembly. A support assembly supports the strobe lamp/driver assembly on the bicycle. The support assembly includes a first end and a second end. The first end includes a lamp support for supporting the strobe lamp/driver assembly. The second end includes a connector for attaching the support assembly to the bicycle. The support assembly has a predetermined length; and the support assembly, in conjunction with the connector, is capable of supporting the strobe lamp/driver assembly on the bicycle in a plane spaced from and parallel to the longitudinal axis of the bicycle, such that the light emitted from the strobe lamp/driver assembly is visible from the front, the left side, the right side, and the back of the bicycle and to the rider, simultaneously. The source of electric power may be an electric generator driven by rotation of a wheel of the bicycle or a battery.

The first end of the support assembly may include a bracket portion which includes a shape that is complementary to the shape of the exterior surface of the strobe lamp/driver assembly. The second end of the support assembly may include a two-part connector for attaching the support assembly to a seat post of the bicycle. The two-part connector may include two semi-circular members for sandwiching a bicycle seat post therebetween for supporting the support assembly on the bicycle seat post.

More specifically, the support assembly may include a flask-shaped support member which includes a continuous, closed first end for supporting the strobe lamp/driver assembly. The closed first end includes two ends. Two extension members, connected to the two respective ends, extend away from the closed first end. Semicircular members, formed in the respective extension members, are employed for sandwiching the bicycle seat post between the respective semicircular members, for supporting the support assembly on the bicycle seat post.

An air whistle assembly may fit over the strobe lamp/driver assembly and may be supported by the strobe lamp/driver assembly. The air whistle assembly sounds an audible signal as air moves past the air whistle assembly. The air whistle assembly includes whistle elements. The whistle elements are supported by vane elements. The vane elements are supported by a lamp cover. The lamp cover is supported by a rotatable platform assembly, and the rotatable platform assembly is supported by the strobe lamp/driver assembly.

The rotatable platform assembly includes a stationary base member, supported by the strobe lamp/driver assembly, and a rotatable platform member, supported by the stationary base member. The rotatable platform member includes vertical projections which engage complementary notches in a base member of the lamp cover.

The lamp cover includes a first portion and a second portion. The first portion includes a partial reflector, and the second portion includes a transparent portion. The partial reflector portion permits a portion of light landing on the partial reflector to be reflected and a portion of the light landing on the partial reflector be transmitted through the partial reflector. The partial reflector may include a partially silvered surface. In this respect, the lamp cover emits two lighted state signals. The first light signal has a first level of brightness, and a second light signal has a second level of brightness.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved high visibility bicycle light signal apparatus which has all of the advantages of the prior art and none of the disadvantages.

It is another object of the present invention to provide a new and improved high visibility bicycle light signal apparatus which may be easily and efficiently manufactured and marketed.

It is a further object of the present invention to provide a new and improved high visibility bicycle light signal apparatus which is of durable and reliable construction.

An even further object of the present invention is to provide a new and improved high visibility bicycle light signal apparatus which is susceptible of a low cost of manufacture with regard to both materials and labor, and which accordingly is then susceptible of low prices of sale to the consuming public, thereby making such high visibility bicycle light signal apparatus available to the buying public.

Still yet a further object of the present invention is to provide a new and improved high visibility bicycle light signal apparatus which directs a flashing light signal to the front of the bicycle.

Still another object of the present invention is to provide a new and improved high visibility bicycle light signal apparatus which gives an indication to the rider that the signal is either working or not working.

Yet another object of the present invention is to provide a new and improved high visibility bicycle light signal apparatus which uses a single flashing signal light.

Even another object of the present invention is to provide a new and improved high visibility bicycle light signal apparatus which emits two lighted state signals, that is, a first light signal having a first level of brightness and a second light signal having a second level of brightness.

Still a further object of the present invention is to provide a new and improved high visibility bicycle light signal apparatus that gives an audible signal to the rider indicating that the signal light is operating.

Yet another object of the present invention is to provide a new and improved high visibility bicycle light signal apparatus that provides a visible signal in a pattern of nearly 360 degrees around the signal light.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view of a first preferred embodiment of the high visibility bicycle light signal apparatus of the invention attached to a bicycle.

FIG. 5 is a bottom view of the strobe lamp/driver assembly of the invention taken along the line 5—5 of FIG. 4.

FIG. 7 is an exploded perspective view of a second preferred embodiment of the high visibility bicycle light signal apparatus of the invention which includes an air whistle assembly.

FIG. 8 is a top view of the embodiment shown in FIG. 7 taken along the line 7—7 thereof.

DESCRIPTION OF THE PREFERRED EMBODIMENT

Figure 3:
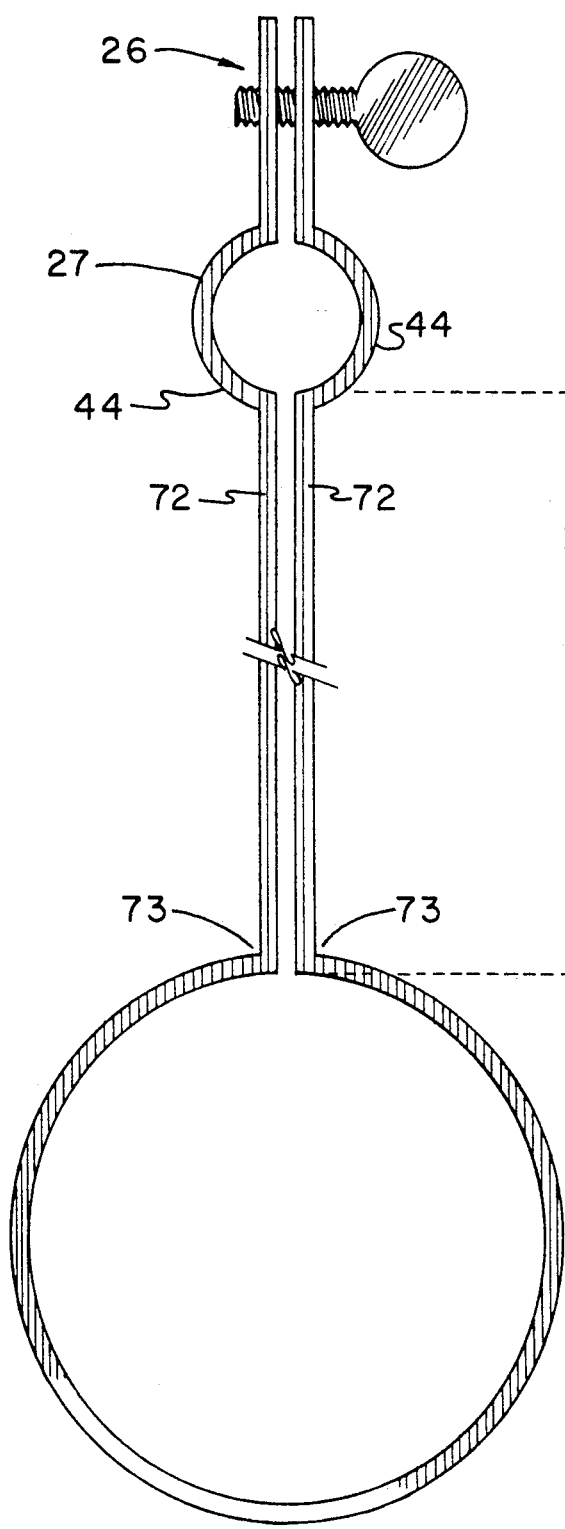
FIG. 3 is a plan view of a flask-shaped support assembly used to attach the strobe lamp/driver assembly of the invention to the bicycle.

With reference to the drawings, a new and improved high visibility bicycle light signal apparatus embodying the principles and concepts of the present invention will be described.

Turning initially to FIGS. 1-6, there is shown a first exemplary embodiment of the high visibility bicycle light signal apparatus 10 of the invention for use on a bicycle 11 which has a frame 30, a front portion 32, a left side 33, a right side 34, a back portion 35, and a longitudinal axis 36 extending from the front portion 32 to the back portion 35 of the bicycle 11. The high visibility bicycle light signal apparatus 10 includes a strobe light assembly 12 which includes a source of electric power 14 and a strobe lamp/driver assembly 15. A support assembly 18 supports the strobe lamp/driver assembly 15 on the bicycle 11. The support assembly 18 includes a first end 24 and a second end 26. The first end 24 includes lamp support 25 for supporting the strobe lamp/driver assembly 15. The second end 26 includes connector 27 for attaching the support assembly 18 to the bicycle 11 for supporting the strobe lamp/driver assembly 15 on the bicycle 11. The support assembly 18 has a length 22. The connector 27 is capable of supporting the support assembly 18 on the bicycle 11 such that the strobe lamp/driver assembly 15 is positioned in a plane spaced from and parallel to the longitudinal axis 36, such that light emitted from the strobe lamp/driver assembly 15 is visible from the front, the left side, the right side, and the back of the bicycle 11 and to the rider, simultaneously.

Figure 2:
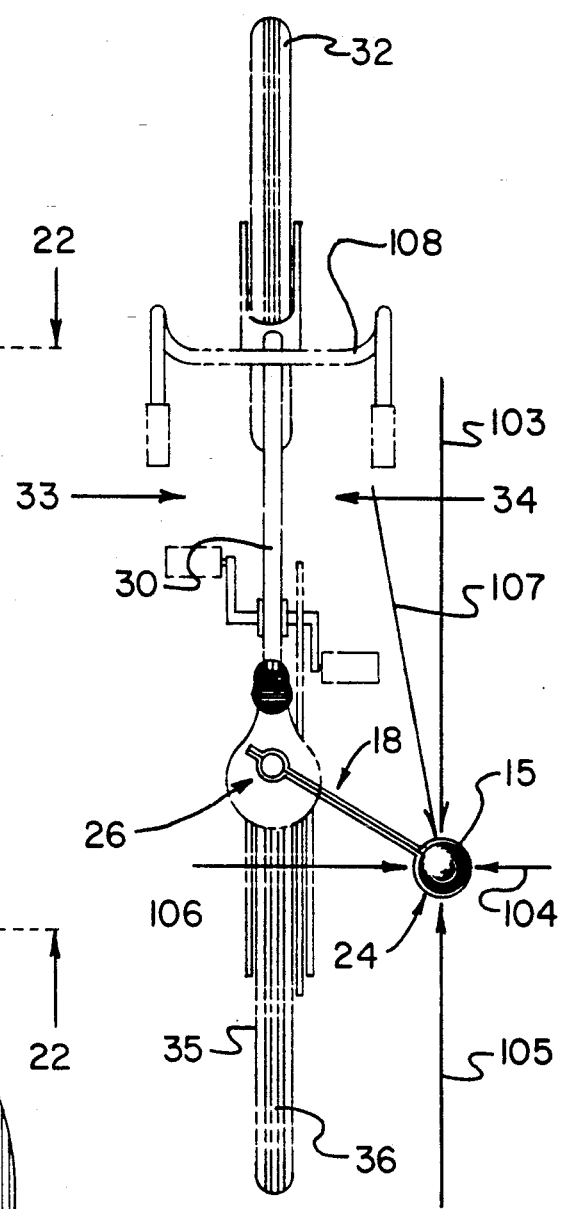
FIG. 2 is a top view of the embodiment of the invention shown in FIG. 1.
Figure 4:
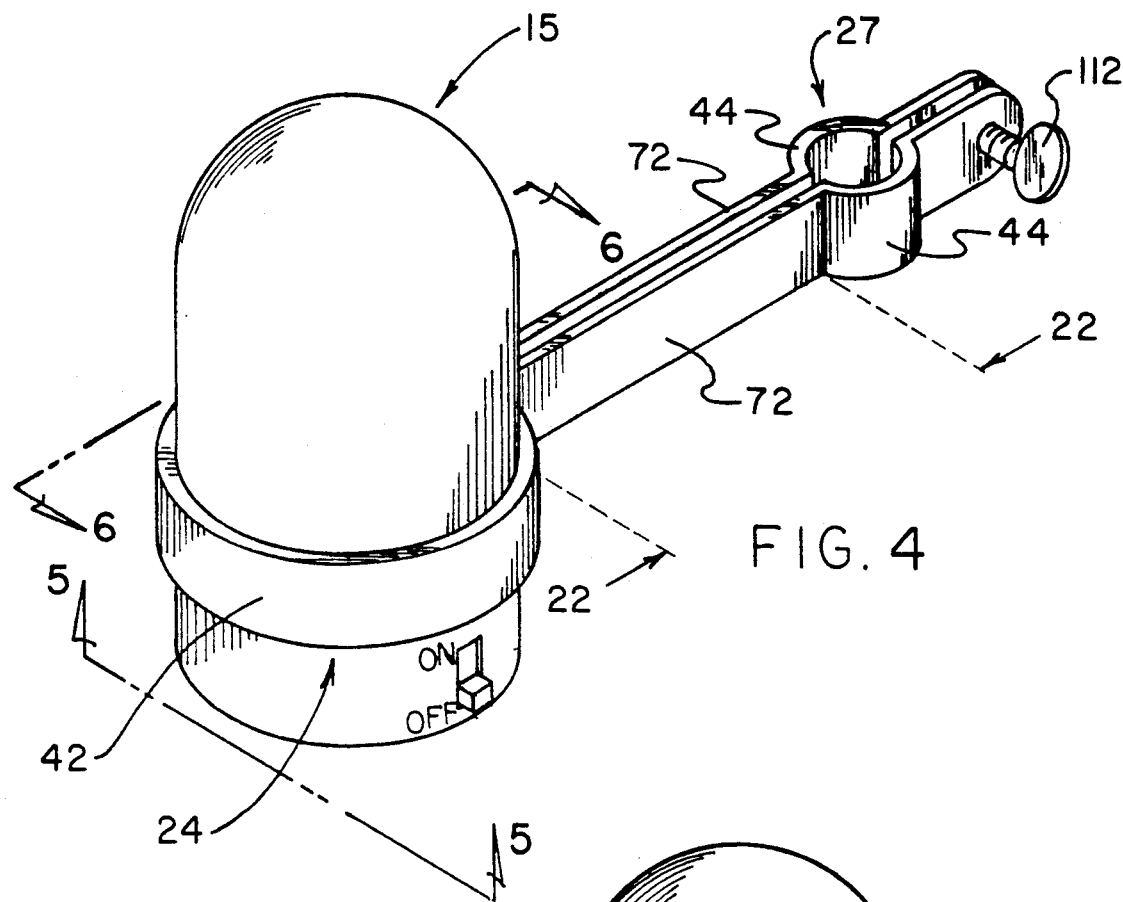
FIG. 4 is an enlarged perspective view of the strobe lamp/driver assembly of the invention attached to the flask-shaped support assembly.
Figure 6:
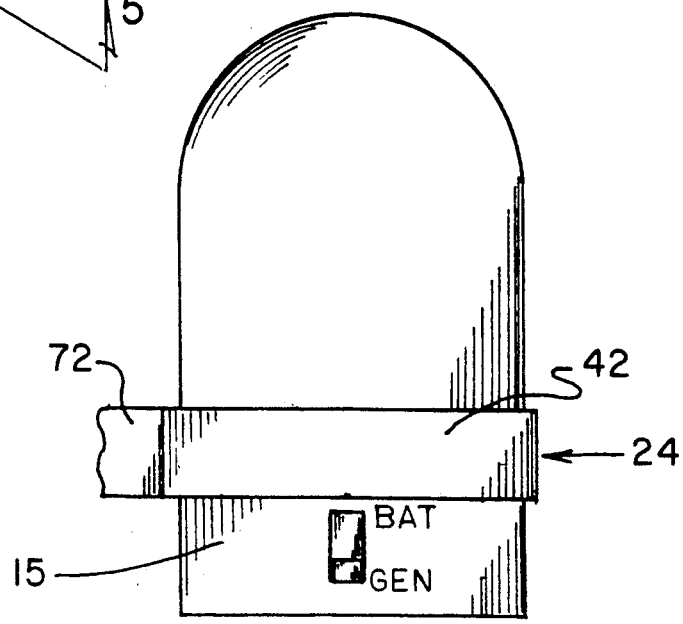
FIG. 6 is a partial side view of the embodiment shown in FIG. 4 taken along the line 6—6 thereof.

More specifically, referring to FIG. 2, several different points of view are represented. Arrow-headed line 103 represents a point of view from the front of the bicycle. Arrow-headed line 104 represents a point of view from the right side of the bicycle. Arrow-headed line 105 represents a point of view from the back of the bicycle. Arrow-headed line 106 represents a point of view from the left side of the bicycle. Arrow-headed line 107 represents a point of view from the a hand of the rider on the handle bar 108. It is clear that light from the strobe lamp/driver assembly 15 is visible to all the respective points of view 103, 104,105, 106, and 107, simultaneously.

Further with respect to the point of view 107, when light from the strobe lamp/driver assembly 15 falls upon a hand of a rider on the handle bar, the rider can see a reflection of light on his hand, and the rider is made aware of the proper functioning of the signal light. If the rider does not see a signal light reflection on his hand, then the rider knows that the signalling apparatus is not functioning properly.

The source of electric power 14 includes either (a) an electric generator 80, supported on a rear fork 38, driven by rotation of a wheel 37 of the bicycle 11, or (b) a battery 81. The battery 81 is housed in a battery holder 39 which is supported by a frame member 40 of the bicycle 11.

The first end 24 of the support assembly 18 includes a bracket portion 42 which includes a shape that is complementary to a shape of an exterior surface of the strobe lamp/driver assembly 15. In the embodiment shown, the bracket portion 42 is circular in shape, which is complementary to the circular shape of the exterior surface of the strobe lamp/driver assembly 15.

The second end 26 of the support assembly 18 includes two-part connector 27 for attaching the support assembly 18 to a seat post 43 of the bicycle 11 for supporting the strobe lamp/driver assembly 15 on the bicycle 11. The two-part connector 27 includes two semicircular members 44 for sandwiching the bicycle seat post 43 therebetween for supporting the support assembly 18 on the bicycle seat post 43.

More specifically, the support assembly 18 includes a flask-shaped support member 70 which includes a continuous closed first end 24 for supporting the strobe lamp/driver assembly 15. The closed first end 24 includes two ends 73, two extension members 72 connected to the two respective ends 73 and extending away from the closed first end 24, and semicircular members 44, formed in the respective extension members 72, for sandwiching a bicycle seat post 43 between the respective semicircular members 44, for supporting the support assembly 18 on the bicycle seat post 43. A wing screw 112 is used to secure the semicircular members 44 to the seat post 43.

Turning to FIGS. 7-8, a second embodiment of the invention is shown. Reference numerals are shown that correspond to like reference numerals that designate like elements shown in the other figures. In addition, an air whistle assembly 46 fits over the strobe lamp/driver assembly 15 and is supported by the strobe lamp/driver assembly 15. The air whistle assembly 46 sounds an audible signal as air moves past the air whistle assembly 46.

The air whistle assembly 46 includes whistle elements 47 which are supported by vane elements 48. The vane elements 48 are supported by a lamp cover 49 which is supported by a rotatable platform assembly 50. The rotatable platform 50 is supported by the strobe lamp/driver assembly 15.

The rotatable platform assembly 50 includes a stationary base member 52, supported by the strobe lamp/driver assembly 15, and a rotatable platform member 54, supported by the stationary base member 52. The rotatable platform member 54 member includes vertical projections 56 which engage complementary notches 58 in a base member 60 of the lamp cover 49.

In operation, when air passes through the whistle elements 47 an audible signal is created. When air pushes up against the vane elements 48, the lamp cover 49 is rotated. As the lamp cover 49 rotates, the notches 58 in the base member 60 engage the vertical projections 56 on the rotatable platform member 54, causing the rotatable platform member 54 to rotate on the stationary base member 52. In this way, the lamp cover 49 rotates when pushed by flowing air.

The lamp cover 49 includes a first portion and a second portion. The first portion includes a partial reflector 62 and the second portion includes a transparent portion 64. The partial reflector 62 portion permitting a portion of light landing on the partial reflector 62 to be reflected and a portion of the light landing on the partial reflector 62 be transmitted through the partial reflector 62. The partial reflector 62 includes a partially silvered surface. In operation, when the lamp cover 49 is driven by the air to rotate, the lamp cover 49 emits two lighted-state signals. A first light signal has a first level of brightness as some of the strobe light passes directly through the transparent portion 64 and some of the strobe light is first reflected off of the partial reflector 62 and then passes out of the transparent portion 64. A second light signal has a second level of brightness as some of the strobe light passes through the partial reflector 62.

Figure 9:
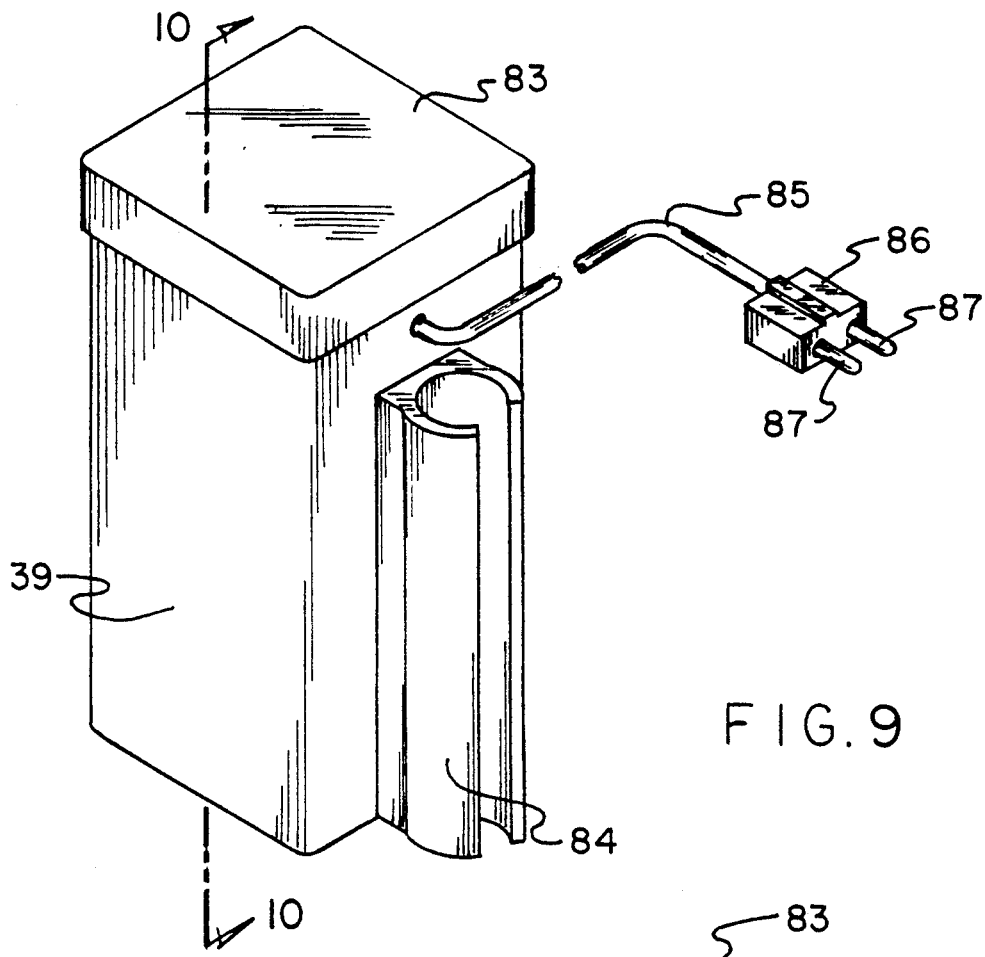
FIG. 9 is a perspective view of a holder for a battery used to power the strobe lamp/driver assembly of the invention.
Figure 10:
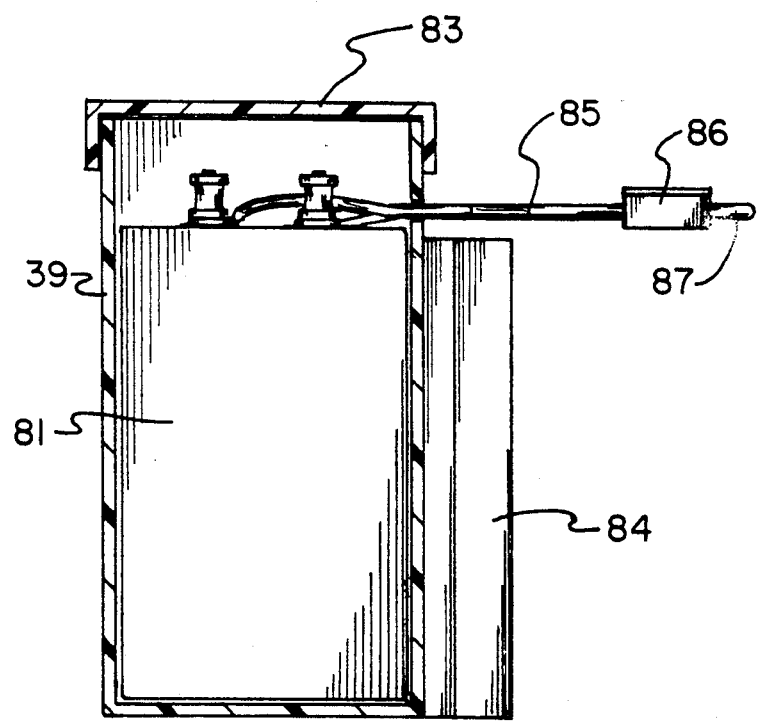
FIG. 10 is a cross-sectional view of the battery holder shown in FIG. 9 taken along the line 10—10 thereof.

Turning to FIGS. 9-10, a holder for a battery 81 used to power the strobe lamp/driver assembly 15 of the invention is shown. Reference numerals are shown that correspond to like reference numerals that designate like elements shown in the other figures. In addition, a cover 83 covers the battery holder 39. A connector portion 84 is attached to the battery holder 39 and is adapted to engage frame member 40 for supporting the battery holder 39 on the bicycle 11 (see FIG. 1). A cable 85 runs from the battery 81 to a connector 86 which has plug elements 87 adapted to plug into complementary jacks 88 located on the bottom of strobe lamp/driver assembly 15 (see FIG. 5).

Figure 11:
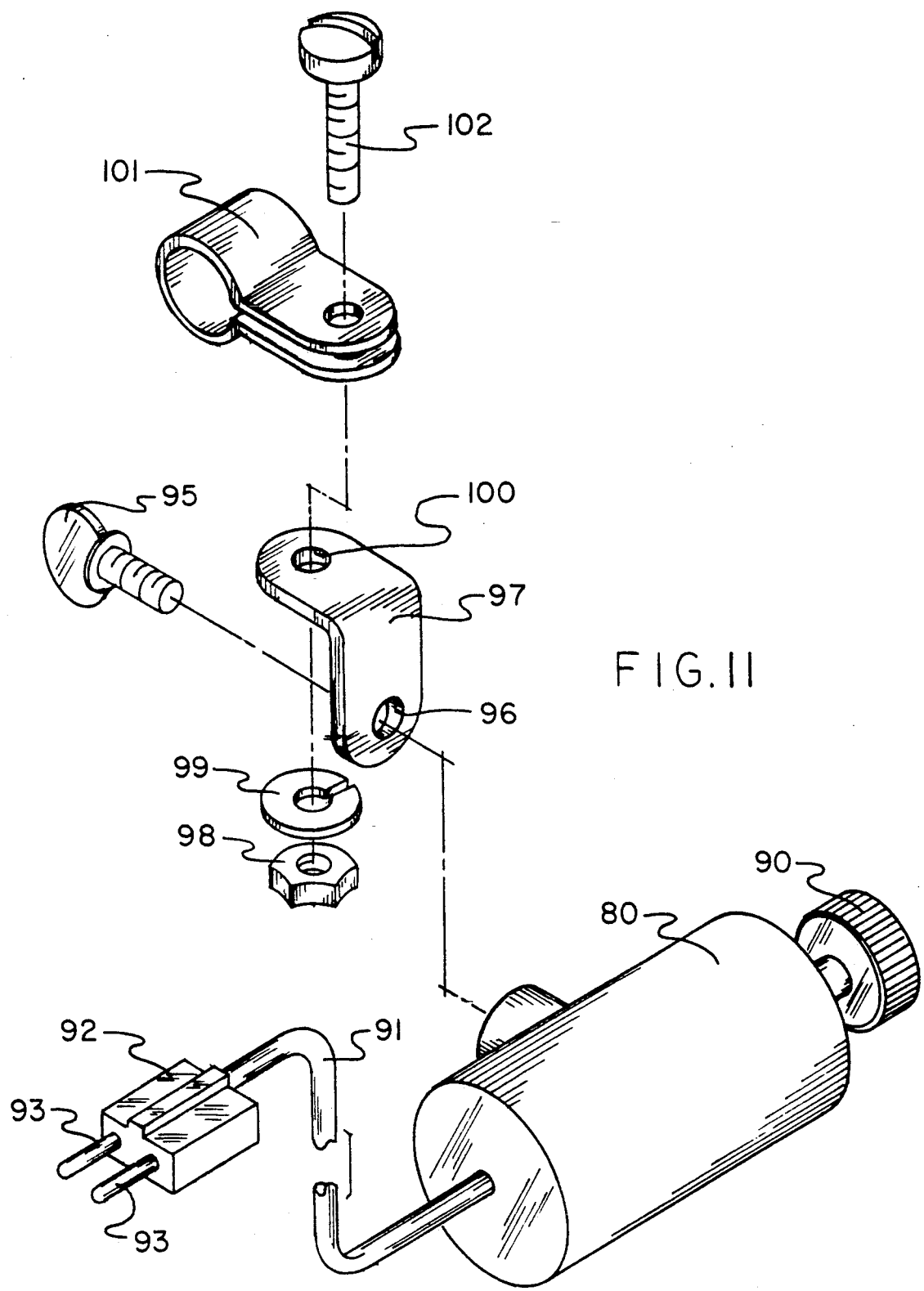
FIG. 11 is an exploded perspective view of an electric generator used for powering the strobe lamp/driver assembly of the invention; also shown are means for attaching the generator to the bicycle.

Turning to FIG. 11, an electric generator 80 used for powering the strobe lamp/driver assembly 15 of the invention is shown. Also shown are hardware used for attaching the generator 80 to the bicycle 11. Reference numerals are shown that correspond to like reference numerals that designate like elements shown in the other figures. In addition, generator 80 includes driven gear 90 which is rotated by wheel 37 of the bicycle 11 when the wheel 37 turns. A cable 91 runs from the generator 80 to a connector 92 that has plug elements 93 that are adapted to plug into complementary jacks 94 located on the bottom of strobe lamp/driver assembly 15 (see FIG. 5).

The following hardware elements are used to attach the generator 80 to the rear fork 38 of the bicycle 11 (see FIG. 1): wing screw 95, a first aperture 96 of L-shaped bracket 97, nut 98, washer 99, a second aperture 100 of L-shaped bracket 97, cylindrical shaped bracket 101, and screw 102. The cylindrical portion of the cylindrical shaped bracket 101 fits around the rear fork 38 of the bicycle 11. The wing screw 95 is used to secure the generator 80 to the L-shaped bracket 97. The nut 98, washer 99, and screw 102 are used to secure the L-shaped bracket 97 to the cylindrical shaped bracket 101.

Although a wide variety of well known strobe lamps and strobe driver circuitry can be used with the invention, the strobe driver circuitry disclosed in above-mentioned U.S. Pat. No. 5,015,918 may be readily adapted for driving the strobe lamp of the invention. In this respect, U.S. Pat. No. 5,015,918 is incorporated herein by reference.

The components of the high visibility bicycle light signal apparatus of the invention can be made from inexpensive and durable metal or plastic materials.

It is apparent from the above that the present invention accomplishes all of the objects set forth by providing a new and improved high visibility bicycle light signal apparatus that is low in cost, relatively simple in design and operation, and which may advantageously be used to direct a flashing light signal to the front of the bicycle. Also, with the invention, an indication is given to the rider that the signal is either working or not working. With the invention, a single flashing signal light is employed. With the invention, two lighted state signals are emitted, that is, a first light signal is emitted having a first level of brightness, and a second light signal is emitted having a second level of brightness. With the invention, an audible signal is given to the rider indicating that the signal light is operating. With the invention, a visible signal is provided in a pattern of nearly 360 degrees around the signal light.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved high visibility light signal apparatus for use on a bicycle which has a frame, a front portion, a left side, a right side, a back portion, and a longitudinal axis extending from the front portion to the back portion of the bicycle, said apparatus comprising:

a strobe light assembly which includes a source of electric power and a strobe lamp/driver assembly, and support assembly means for supporting said strobe lamp/driver assembly on the bicycle, said support assembly means including a first end and a second end, said first end including lamp support means for supporting said strobe lamp/driver assembly, said second end including connector means for attaching said support assembly means to the bicycle for supporting said strobe lamp/driver assembly on the bicycle, wherein said support assembly means have a length and said connector means are capable of supporting said support assembly means on the bicycle such that said strobe lamp/driver assembly is positioned in a plane spaced from and parallel to said longitudinal axis, such that signal light from said strobe lamp/driver assembly is visible from the front, the left side, the right side, and the back of the bicycle simultaneously.

2. The apparatus described in claim 1 wherein said source of electric power includes an electric generator driven by rotation of a wheel of the bicycle.

3. The apparatus described in claim 1 wherein said source of electric power is supported on a rear fork of the bicycle.

4. The apparatus described in claim 1 wherein said source of electric power includes a battery.

5. The apparatus described in claim 4 wherein said battery is housed in a battery holder which is supported by a frame member of the bicycle.

6. The apparatus described in claim 1 wherein said first end of said support assembly means includes a bracket portion which includes a shape that is complementary to a shape of an exterior surface of said strobe lamp/driver assembly.

7. The apparatus described in claim 1 wherein said second end of said support assembly means includes two-part connector means for attaching said support assembly means to a seat post of the bicycle for supporting said strobe lamp/driver assembly on the bicycle.

8. The apparatus described in claim 7 wherein said two-part connector means include two semicircular members for sandwiching a bicycle seat post therebetween for supporting said support assembly means on the bicycle seat post.

9. The apparatus described in claim 1 wherein said support assembly means include a flask-shaped support member which includes:

a continuous closed first end for supporting said strobe lamp/driver assembly, said closed first end including two ends, two extension members, connected to said two respective ends, and extending away from said closed first end, and semicircular members, formed in said respective extension members, for sandwiching a bicycle seat post between said respective semicircular members, for supporting said support assembly means on the bicycle seat post.

10. The apparatus described in claim 1, further including:

air whistle assembly means, fitting over said strobe lamp/driver assembly and supported by said strobe lamp/driver assembly, for sounding an audible signal as air moves past said air whistle assembly means.

11. The apparatus described in claim 10 wherein said air whistle assembly means include whistle elements, which are supported by vane elements, which are supported by a lamp cover, which is supported by a rotatable platform assembly, which is supported by said strobe lamp/driver assembly.

12. The apparatus described in claim 11 wherein said rotatable platform assembly includes a stationary base member, supported by said strobe lamp/driver assembly, and a rotatable platform member, supported by said stationary base member.

13. The apparatus described in claim 10 wherein said rotatable platform member includes vertical projections which engage complementary notches in a base member of said lamp cover.

14. The apparatus described in claim 10 wherein said lamp cover includes a first portion and a second portion, said first portion including a partial reflector and said second portion including a transparent portion, said partial reflector portion permitting a portion of light landing on said partial reflector to be reflected and a portion of the light landing on said partial reflector be transmitted through said partial reflector.

15. The apparatus described in claim 14 wherein said partial reflector includes a partially silvered surface.

* * * * *